455/6

United States Patent [19]

Ostuni et al.

[11] 3,801,915

[45] Apr. 2, 1974

[54] METHOD AND APPARATUS FOR CONVERTING ELECTRICAL SIGNALS

[75] Inventors: Joseph J. Ostuni, Liverpool; Floyd O. Vincent, East Syracuse, both of N.Y.

[73] Assignee: The Magnavox Company, Ft. Wayne, Ind.

[22] Filed: Jan. 31, 1973

[21] Appl. No.: 328,424

Related U.S. Application Data

[63] Continuation of Ser. No. 120,994, March 4, 1971, abandoned.

461

[52] U.S. Cl. ................ 325/453, 325/308, 325/432, 325/436, 325/459, 325/462, 325/464, 334/15

[51] Int. Cl. ........................................ H04b 1/16

[58] Field of Search ........................ 325/458–465, 325/308, 432, 436, 453, 468; 334/14–16, 29, 1, 7; 323/74, 79, 80, 81, 94; 178/DIG. 13

[56] References Cited

UNITED STATES PATENTS 3,679,980 7/1969 Midgley ........................ 325/464

*Primary Examiner*—Albert J. Mayer

*Attorney, Agent, or Firm*—Neuman, Williams, Anderson & Olson

[57] ABSTRACT

A converter for converting the frequencies of input signals in one of a number of channels to frequencies within a predetermined channel includes a first mixer for raising the frequency of the input signals so that signals within a selected channel are raised to a supervideo channel, and a second mixer for lowering the frequencies of signals within the supervideo channel to a predetermined television channel. The first mixer is a balanced, push-pull circuit, and incorporates a varactor oscillator which is controlled by pushbutton adjustment of a d.c. potential to oscillate at a selected frequency above the supervideo band.

7 Claims, 5 Drawing Figures

INVENTORS
Joseph J. Osturni
Floyd Q. Vincent
by Pendleton, Neuman, Williams & Anderson
Att'ys

METHOD AND APPARATUS FOR CONVERTING ELECTRICAL SIGNALS

This is a continuation, of U.S. Pat. application Ser. No. 120,994 filed Mar. 4, 1971 now abandoned.

BACKGROUND

This invention relates to a converter and especially to a converter employed with a conventional television receiver to convert a band of frequencies transmitted over a transmission line such as a CATV cable to the frequency band of a predetermined television channel, to permit the receiver to receive, when tuned to the predetermined channel, a selected one of a number of channels transmitted over the CATV cable, which may occupy a broader bandwidth than the tuning range of the receiver.

With the advent of subscription television, there have been many attempts to design converters for converting program material from a form in which it is transmitted over a transmission line, into a form which can be readily used by a conventional television receiver. Some of the converters which have been designed for this purpose accept program material from a transmission line on the same frequency bands as commercial VHF television channels, and also signals on bands other than those to which a conventional television receiver can be tuned. Some converters convert the carrier frequency to an intermediate frequency of approximately 40 to 50 MHz, after which a second conversion shifts the carrier frequency to a standard television channel, and the resulting signals are connected to the r.f. input of a television receiver.

While such systems achieve the advantage of permitting a conventional television receiver to make a selection among more sources of program material than are available on commercial television, serious disadvantages accompany their use. For example, the intermediate frequency employed is lower in frequency than all of the commercial television channels, and so the intermediate frequency itself and many of its harmonics are serious sources of interference. Moreover, the intermediate frequency and its harmonics, as well as the frequency of the oscillator needed to convert the input signals to the intermediate frequency, may beat with the frequencies of signals on other channels to produce, at frequencies within passbands of the desired channel, additional interference.

In order to minimize interference problems, it is necessary to provide a high degree of shielding for such converters, so as to prevent interaction between different parts of the converter apparatus itself, and to prevent transfer of interfering signals to the television set or to the cable by which the program material is transmitted.

Another requirement of such converters is the need for circuits of restrictive bandpass in their input sections, to reduce or eliminate unwanted program signals which would otherwise interfere with the desired program signals. These circuits are individual to specific channels, and therefore complicated switching devices are required to modify the circuitry of the r.f. sections of the converters to conform to the passbands of each input channel.

The switching devices are also required to select the frequency of the oscillator needed to make the conversion to the intermediate frequency. The frequencies needed for the conversion of conventional television channels to an intermediate frequency range well over an octave, which makes it unfeasible to employ a single oscillator with variable components.

It is accordingly an important object of the present invention to provide a method and apparatus in which the above described disadvantages are avoided, while preserving the advantages of the converter systems.

Another object of the present invention is to provide a converter in which no interfering signals are used, or produced as a result of the operation of the converter.

A further object of the present invention is to provide a converter which does not require the switching of tuned circuits in order to select input program material.

Another object of the present invention is to provide a converter having a fixed filter interposed between the source of program material and the first mixer stage of the converter.

A further object of the present invention is to provide a mixer for converting the frequency of input program material while suppressing second order harmonics from its output.

Another object of the present invention is to provide a converter in which a frequency variation of less than one octave is required for a locally generated signal in order to convert the frequency of the program material.

A further object of the present invention is to provide an improved design for the mixer of a converter, in which harmonics and spurious signals are suppressed.

Another object of the present invention is to provide an improved design of an oscillator for a converter, in which program channels may be selected by switching only d.c. voltage levels instead of switching frequency-sensitive elements of tuned circuits.

These and other objects of the present invention will become manifest upon examination of the following description and accompanying drawings.

SUMMARY OF THE INVENTION

In accordance with a preferred exemplary embodiment of the present invention, a converter is provided to respond to a range of frequencies extending from 50 MHz to 250 MHz. All of the signals on input channels are raised, so that a selected channel is raised to a supervideo channel of approximately 400 MHz, and then the selected channel is lowered from the supervideo channel to a frequency band coextensive with a commercial television channel.

BRIEF DESCRIPTION OF THE DRAWINGS

Reference will now be made to the accompanying drawings in which.

DESCRIPTION OF THE PREFERRED EMBODIMENT

Figure 1:
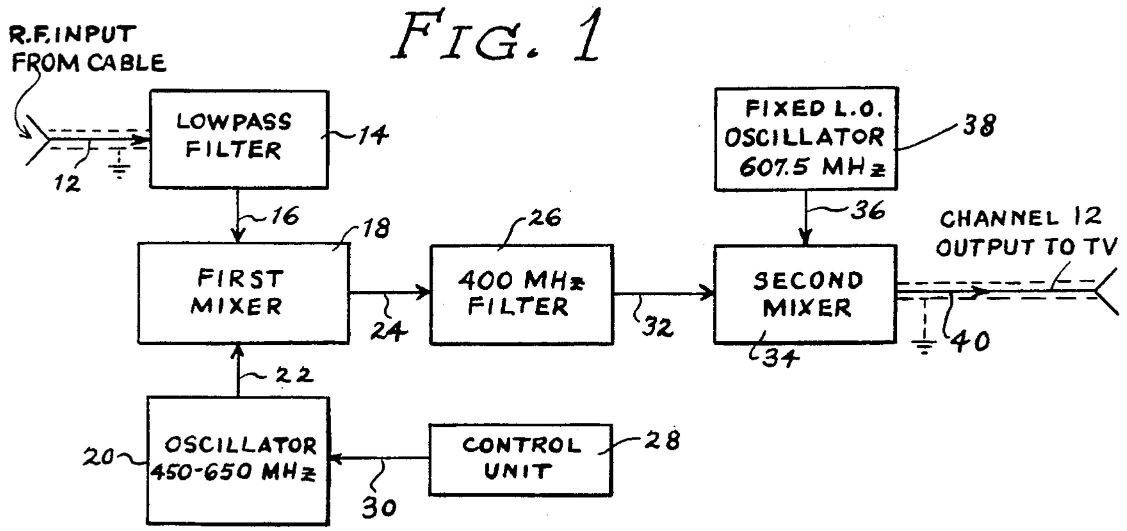
FIG. 1 is a functional block diagram of an exemplary embodiment of the present invention.

Referring now to FIG. 1, an exemplary embodiment of the present invention is illustrated. The r.f. input from a cable or other source of input program material is applied to an input line 12, connected to the input of a low pass filter 14. The low pass filter 14 is designed to pass frequencies no higher than the highest frequency of program material supplied to the input line 12. As the input frequency applied to the line 12 preferably includes all of the VHF television channels, and also frequencies above channel 13 up to about 250 MHz, the filter 14 has its cutoff frequency slightly above 250 MHz. As described hereinafter, the supervideo channel is substantially above 250 MHz, and so any component of the supervideo frequency which may have found its way to the input line 12 is eliminated by the filter 14.

The output of the filter 14 is connected by a line 16 to the input of a mixer 18. Another input of the mixer 18 is supplied by an oscillator 20 over a line 22. The oscillator 20 is tunable over the range of 450 MHz to 650 MHz, so that the mixer 18 provides on an output line 24 signals including one signal of approximately 400 MHz and other signals of substantially higher frequency, corresponding to the difference and sum of the several input frequencies. The difference signal of a selected channel only is selected by a 400 MHz bandpass filter 26, which has its input connected to the line 24. The filter 26 is arranged to have a passband of approximately 6 MHz, the standard bandwidth of a television channel. Accordingly, all extraneous signals which may be produced by the converter 18 are eliminated by the filter 26.

The frequency produced by the oscillator 20 is controlled by a control unit 28, connected to the tuner section 20 by means of a line 30. The control unit 28 includes a plurality of pushbuttons, which are individually actuatable to provide individual levels of d.c. potential on the line 30. The value of the d.c. potential on the line 30 determines the frequency produced by the oscillator 20, as described hereinafter.

The output of the 400 MHz filter 26 is supplied to a line 32 connected to the input of a second mixer 34. Another input of the mixer 34 is supplied by line 36 from an oscillator 38 which has fixed frequency of a value somewhat higher than the 400 MHz supervideo channel frequency. The mixer 34 produces sum and difference signals, and these signals are connected by means of a line 40 to the r.f. input of a television receiver (not shown). The difference frequency produced by the mixer 34 is approximately the same as one of the commercial television channels, and in a preferred embodiment is channel 12, the frequency of the oscillator 38 being, in that case, 607.5 MHz. The sum frequency of 1.0075 GHz, which is also produced at the output of the converter 34, is much higher than any frequency which can be used by the television receiver and is accordingly rejected by the r.f. section of the receiver in the ordinary manner.

Figure 2:
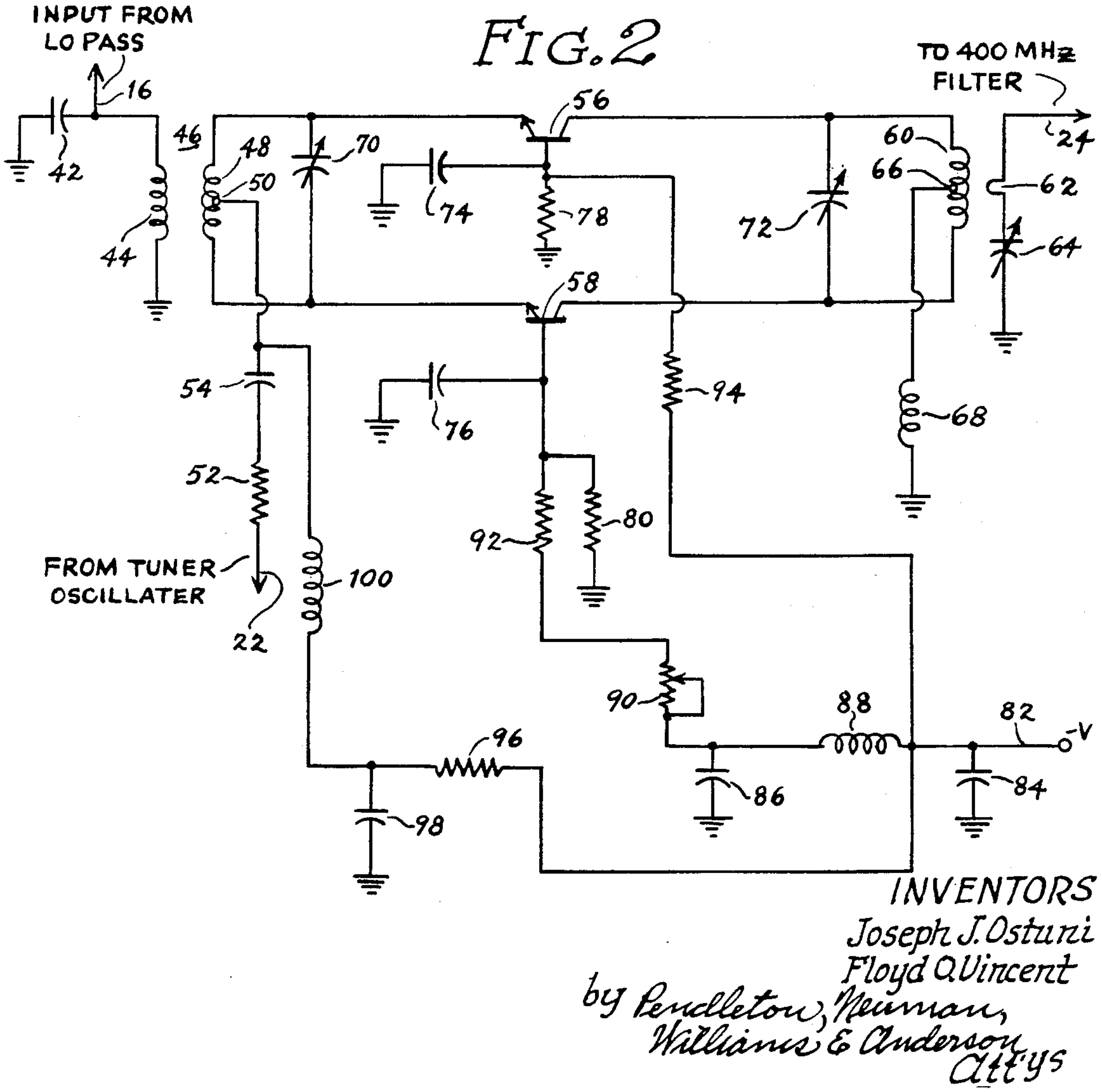
FIG. 2 is a schematic diagram, partly in functional block diagram form, of a mixer employed in the apparatus of FIG. 1.

Referring now to FIG. 2, a schematic diagram of the mixer 18 is illustrated. The line 16 is connected from the output of the low pass filter 14 shown in FIG. 1 and is connected to one end of a capacitor 42, the opposite end of which is connected to ground. A coil 44 is the primary of a transformer 46, the secondary coil 48 of which has a center tap 50. The line 22 from the oscillator is connected through a resistor 52 and a capacitor 54 to the center tap 50.

A pair of transistors 56 and 58 both have their emitters connected to opposite ends of the coil 48, and their collectors are connected to opposite ends of a coil 60. The coil 60 is the primary of an output transformer, the secondary coil 62 of which has one end connected to ground through a capacitor 64 and the other end connected to the line 64, which leads to the 400 MHz filter. A center tap 66 of the coil 60 is connected to ground through a choke 68.

A capacitor 70 is connected in parallel with the coil 48 and a capacitor 72 is connected in parallel with a coil 60. The capacitors 70 and 72 are variable, and are adjusted for optimum performance of the circuit.

The base of the transistor 56 is connected to ground through a capacitor 74 and the base of the transistor 58 is connected to ground by a capacitor 76. A resistor 78 is connected in parallel with the capacitor 74 and a resistor 80 is connected in parallel with the capacitor 76. The bias on the bases of the transistors 56 and 58 is fixed by a circuit connected to a source of negative d.c. potential by line 82. A circuit including capacitors 84 and 86, and an inductor 88 functions as a low pass filter to smooth the voltage supplied from the line 82. The junction of the capacitor 86 and the inductor 88 is connected through a rheostat 90 and a resistor 22 to the base of the transistor 58. The junction of the capacitor 84 and the inductor 88 is connected to the base of the transistor 56 through a resistor 94.

Bias is supplied to the emitters of the transistors 56 and 58 through a filter circuit including resistor 96 and capacitor 98 and an inductor 100 connected from the junction of the resistor 96 and the capacitor 98 to the center tap 50.

The circuit of FIG. 2 comprises a balanced modulator or mixer in which the signal from the oscillator is applied in a balanced manner between the center taps 50 and 66 of the coils 48 and 60. Energy at the oscillator frequency is not transmitted to the coils 44 and 62 because of the balanced current flow in the coils 48 and 60. Accordingly, a high degree of isolation is provided, preventing any signal at the tuner oscillator frequency from passing out of the mixer 18 on either the output line 24 or the input line 16.

The transistors 56 and 58 are biased so that both conduct equally when no input signal is furnished along the input line 16, a condition which may be brought about by adjusting the rheostat 90. The amount of conduction of the transistors 56 and 58 is fixed by the relative bias voltage supplied to the emitters of the transistors by way of center tap 50 and to the bases of the transistors by way of two separate voltage dividers. The base bias of the transistor 56 is fixed by the voltage divider including the resistors 78 and 94, while the resistors 80 and 92 (and the rheostat 90) form a voltage divider fixing the bias at the base of the transistor 58. The capacitors 74 and 76 provide a.c. signal ground to base of transistors.

The circuit of FIG. 2 functions in the manner of a balanced modulator to make available at the output lead 24 signals having frequencies equal to the sum and difference of the frequencies of signals supplied to the mixer by way of the lines 16 and 22. In addition, the output signals on the line 24 have components at the frequencies supplied to the mixer along the line 16. The push-pull arrangement of the circuit of the mixer 18 minimizes even order harmonics of these frequencies at the output, and odd harmonics are minimized by biasing to operate the transistors 56 and 58 in a more linear portion of their characteristics.

As the frequency of the input signals are in the band from 50 to 240 MHz and the signal derived from the oscillator over the line 22 is in the band from 450 to 650 MHz, depending on the desired channel, the output of the mixer 18 contains the program signal from the desired channel at approximately 400 MHz, and program signals from other channels above and below 400 MHz. The desired program signal is easily isolated by operation of the bandpass filter 26. All of the frequencies present at the output of the mixer 18 are substantially above the IF frequency normally used by television receivers, and so interference caused as a result of radiation from the converter to the receiver is avoided.

Figure 3:
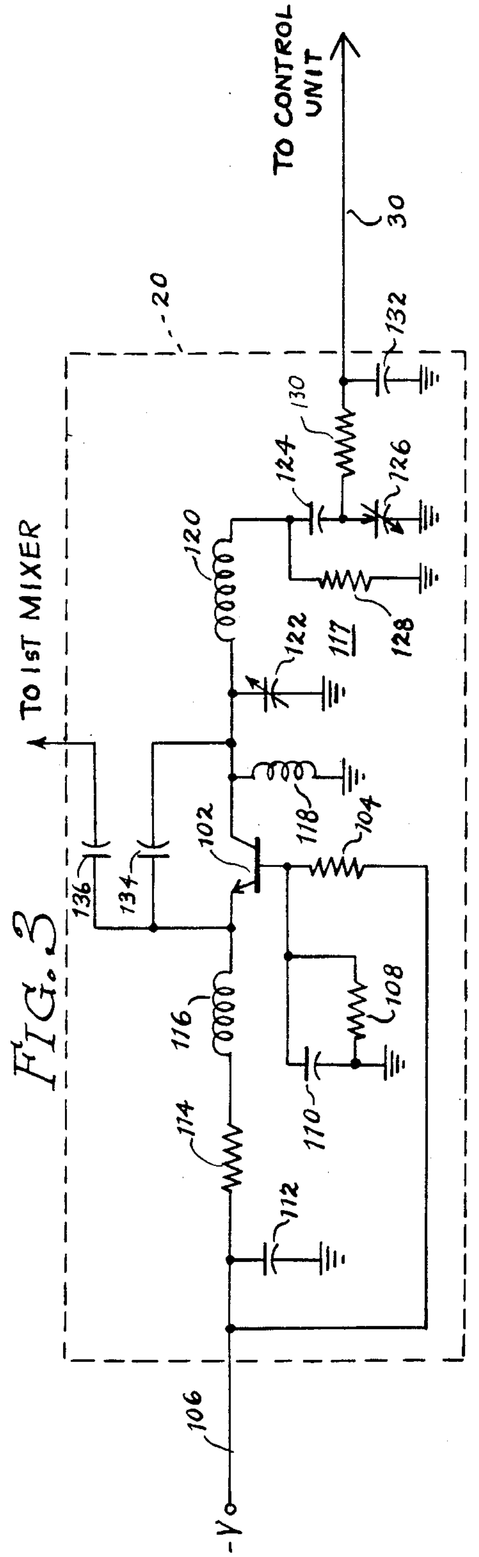
FIG. 3 is a schematic diagram of the oscillator employed in the apparatus of FIG. 1.

Referring to FIG. 3 there is there shown a schematic diagram of the oscillator 20, which generates the signal applied to the line 22. The oscillator incorporates a single transistor 102. The base bias of the transistor 102 is fixed by a resistor 104 connected from the base to a line 106, which is connected to a negative potential. The resistor 104 forms, with a resistor 108 connected between the base of transistor 102 and ground, a voltage divider to establish the proper base bias. A capacitor 110 is connected across the resistor 108. Emitter bias is provided by a circuit connected between the line 106 and a emitter of the transistor 102, including a capacitor 112 connected between the line 106 and ground, and a resistor 114 and a choke coil 116 connected in series between the line 106 and the emitter of the transistor 102.

The collector circuit of the transistor 102 includes a tuned circuit 117 incorporating coils 118 and 120, capacitors 122 and 124 and a varactor 126. The tuned circuit includes a resistor 128 connected in parallel across the series circuit including the capacitor 124 and the varactor 126. The capacitance of the varactor 126 is controlled by the d.c. voltage level on the line 30 which is connected to the junction of the capacitor 124 and the varactor 126 through a resistor 130. A capacitor 132 is connected from the line 30 to ground to bypass any high frequency signals which may be picked up by the line 30.

The resonant frequency of the tuned circuit 117 is dependent upon the capacity of the varactor 126 and this in turn depends upon the d.c. voltage level present on the line 30. The capacitor 122 is made adjustable so that the variation in voltage level on the line 30 causes the oscillator to oscillate at a frequency between 450 MHz and 650 MHz, as desired. A capacitor 134 is connected between the collector and the emitter of the transistor 102, and furnishes the feedback necessary for oscillation. The emitter of the transistor 102 is connected to the output line 22 through a coupling capacitor 136.

Figures 4, 5:
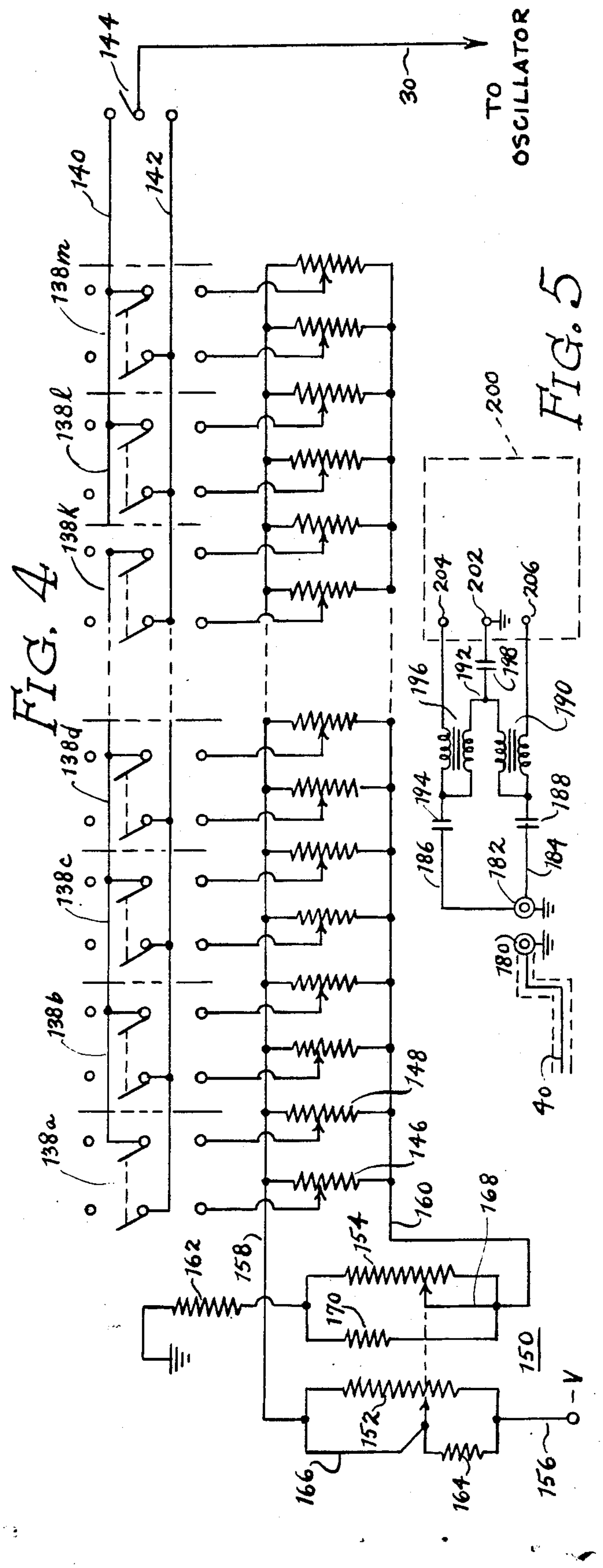
FIG. 4 is a schematic diagram of the control unit employed in the apparatus of FIG. 1.
FIG. 5 is a schematic diagram of a circuit which may be used for connecting the apparatus of FIG. 1 to an ordinary television receiver.

Referring now to FIG. 4, a schematic diagram of the control unit 28 is illustrated, by which the voltage on the line 30 is controlled. The control unit 28 includes 13 push-buttons, each of which is associated with one of 13 double-pole switches 138*a* through 138*m*. One pole of each switch is connected to a bus 140 and the other poll of each switch is connected to a bus 142. The buses 140 and 142 are connected to the two stationary contacts of a double-throw switch 144, and the movable contact of the switch 144 is connected to the line 30.

A potentiometer 146 is connected to one stationary contact of one pole of the switch 138*a*, and when the switch 138*a* is closed, in response to actuation of its pushbutton, a voltage, determined by the position of the tap of the potentiometer 146, is supplied to the bus 142 and, through the switch 144, to the line 30, provided that the switch 144 is actuated to select the bus 142.

Another potentiometer 148 has its tap connected to the stationary contact of the other pole of the switch 138*a*. Accordingly, when the switch 138*a* is closed and the switch 144 is actuated to select the bus 140, the voltage supplied to the output line 30 is determined by the potentiometer 148.

The end terminals of the potentiometers 146 and 148 are connected in parallel and are supplied by a voltage established by a fine tuning control 150. The fine tuning control includes two potentiometers 152 and 154 connected as rheostats and ganged together so that movement of the tap of one of the two potentiometers is accompanied by a corresponding movement of the tap of the other potentiometer in the same direction thus resulting in an inverse variation of the impedance of the patentiometers 152 and 154.

The line 156 leads from a source of negative potential and is connected to an end terminal of the potentiometer 152. The other end terminal of the potentiometer 152 is connected to a line 158 which joins one end terminal of the two potentiometers 146 and 148. The opposite end terminal of the potentiometers 146 and 148 are connected by a line 160 through the potentiometer 154 and through a fixed resistor 162 to ground. The tap of the potentiometer 152 is connected directly to the line 158 by a line 166. The tap of the potentiometer 154 is connected directly to the line 160 by line 168. A fixed resistor 164 is connected in parallel with the potentiometer 152, and a fixed resistor 170 is connected in parallel with the potentiometer 154. The arrangement of the potentiometers 152 and 154 and the resistors 164 and 170 is such as to maintain substantially the same impedance in the circuit extending from the line 156 to ground, even though the voltage on the lines 158 and 160 may be raised or lowered by movement of the taps of the potentiometers 152 and 154. Thus, the impedance of the control unit 28, as seen by the negative potential source, is constant. The voltage level on the line 30 may be adjusted by operation of the potentiometers 152 and 154 to provide a fine correction of the frequency of the oscillator shown in FIG. 3.

The positions of the taps of the potentiometers 146 and 148 are set when the potentiometers 152 and 154 have their taps set near the middle of their range. The setting of the taps of the potentiometers 146 and 148 correspond to two desired channels. Accordingly, the channel for which the potentiometer 146 is set is selected simply by depressing the push-button which actuates the switch 138*a* and actuating the switch 144 to select the bus 142. In like manner the channel corresponding to the potentiometer 148 may be selected by depressing the push-button associated with the switch 138*a* and operating the switch 144 to select the bus 140. Each of the other switches 138*b* through 138*m* has two potentiometers associated with it which are identical in construction and operation to the potentiometers 146 and 148 which have been described above, except that each potentiometer establishes a different d.c. potential on its respective bus 140 or 142 when its switch is operated. Each of the potentiometers is set to produce the appropriate voltage to cause the oscillator 20 to produce the appropriate frequency to select the desired channel. Accordingly, 26 separate channels may be selected by means of the switches 138*a* through 138*m*. Thirteen channels are selected when the switch 144 is in position to select the bus 140 and the other 13 are selected when the switch 144 is in position to select the bus 142. Preferably the ordinary VHF channels are selected when the switch 144 is in one position, and channels having frequencies not corresponding to regular VHF television channels are selected when the switch 144 is in its other condition.

It will be appreciated that since the control unit 28 produces only a d.c. signal, and any a.c. signals which may be picked up on the line 20 are filtered out by the capacitor 132 (FIG. 3), the control unit 28 may be located in any convenient place and need not be physically close to the oscillator 20.

FIG. 5 illustrates a schematic diagram of a circuit which may be used for connecting the converter of FIG. 1 to a conventional television receiver. The line 40 from the second mixer 34 is connected via plug 180 and jack 182 to a line 184. A ground connection is made from the ground potential of the converter through the plug 180 and jack 182 to a line 186. The line 184 is connected through an isolation capacitor 188 to the common terminal of an auto transformer 190, and through its primary winding to a junction point 192. Similarly, the line 186 is connected through an isolation capacitor 194 to the common terminal of an autotransformer 196, and through its primary winding to the junction point 192. The junction point 192 is connected to the ground potential of a television receiver 200, at terminal 202, through an additional isolation capacitor 198. The secondary windings of the transformers 190 and 196 are connected to terminals 204 and 206 of the television receiver, in lieu of the antenna which is customarily connected to those terminals.

The terminals 204 and 206 are located on the rear panel of the television receiver 200, and are normally connected to a transmission line of 300 ohm characteristic impedance. The ground terminal 200 is also located on the rear panel of the receiver 200.

The circuit of FIG. 5 is preferably located immediately adjacent the receiver 200, and the line 40 interconnecting the converter with the receiver is preferably coaxial cable of 75 ohm characteristic impedance.

The transformers 190 and 196 are adjusted to transform the impedance from 75 ohms to 300 ohms in order to match the impedance of the receiver 200 to the impedance of the line 40. In addition, the transformers are carefully balanced so that interferring signals induced in the line 40 (or the lead in line 12) are cancelled by virtue of being caused to flow equally through both sides of the 300 ohm output. The use of the circuit of FIG. 5 is desirable where there is an energy field in the region of the converter, at a frequency within the output channel of the converter, preferably channel 12. The circuit of FIG. 5 may not be needed when the receiver 200 has a set of 75 ohm input terminals so that the cable 40 may be grounded directly to the chassis of the receiver 200.

The use of the relatively high supervideo channel frequency of 400 MHz avoids the need for frequency-dependent circuits which restrict the passband of the input to the converter in accordance with the channel to be selected, and eliminates many causes of interference. The use of the 400 MHz supervideo frequency also reduces the range over which the oscillator 20 must be tuned to less than one octave, and makes practical the preferred design of the oscillator 20 and the control unit 28. Although the oscillator 20 has been described as tunable over the range from 450 MHz to 650 MHz, it is apparent that its maximum frequency can be increased (for example to 700 MHz) to accommodate additional channels having frequencies above 250 MHz.

While the above description has been in reference particularly to a system for use with a CATV cable, it should be obvious to those skilled in the art that it may be equally well employed when the program signals are supplied to the converter via an antenna, rather than a cable, and for other purposes.

What is claimed is:

1. In a television signal frequency converter apparatus including an impedance element having a variable reactance dependent upon the magnitude of a voltage applied across two terminals thereof, electrical circuitry for tuning said apparatus comprising:

a plurality of tuning potentiometers each of said potentiometers having two end connections and a variable tap;

a source of d.c. potential having a reference point and operative to energize said potentiometers;

a first output bus;

a second output bus;

a plurality of multiple pole switches, each of said switches being associated with two of said potentiometers and being operative to enable the application of a voltage developed at the variable tap of the first potentiometer associated therewith to the first output bus and a voltage at the variable tap of the second potentiometer associated therewith to the second output bus;

an output line coupled to one of said variable reactance element terminals;

switch means for selectively coupling said output line to said first or second bus; and means coupling said other variable reactance element terminal to said d.c. potential source reference point.

2. The tuning circuitry of claim 1 wherein the first end connection of each of said tuning potentiometers are coupled to a first circuit point, the second end connections of each of said tuning potentiometers are connected to a second circuit point, the variable tap of each of said potentiometers is individually coupled to a terminal of the multiple pole switch with which it is associated and each of said first and second circuit points are coupled to said source of d.c. potential.

3. The tuning circuitry of claim 2 further comprising a first variable resistance coupling said first circuit point to said source of d.c. potential and a second variable resistance coupling said second circuit point to said source of d.c. potential.

4. The tuning circuitry of claim 3 further comprising means for simultaneously varying the resistances of said first and second variable resistances such that the resistance of one of said first and second variable resistances decreases as the resistance of the other of said first and second variable resistance increases.

5. A television signal frequency converter apparatus including an impedance element having a variable reactance dependent upon the magnitude of a voltage applied across two terminals thereof, electrical circuitry for tuning said apparatus comprising:

a plurality of tuning potentiometers each of said potentiometers having two end connections and a variable tap;

a source of d.c. potential;

means for coupling one end connection of each of said plurality of potentiometers to a first terminal of said source;

means for coupling a second end connection of each of said plurality of potentiometers to a second terminal of said source;

a plurality of double pole switches each of said switches being associated with two of said potentiometers and including means for completing a first electrical circuit between a first pair of switch terminals and means for completing a second electrical circuit between a second pair of switch terminals;

a first output bus;

a second output bus;

means for coupling one of said first pair of switch terminals of each of said double pole switches to said first output bus;

means for coupling one of said second pair of switch terminals of each of said double pole switches to said second output bus;

means for individually coupling the other of said first pair of switch terminals of each of said double pole switches to the variable tap of the first of said potentiometers associated with said switch;

means for individually coupling the other of said second pair of switch terminals of each of said double pole switches to the variable tap of the second of said potentiometers associated with said switch;

an output line coupled to one of said variable reactance element terminals;

switch means for selectively coupling said output line to said first output bus and said second output bus;

and means coupling the other of said variable reactance element terminals to a terminal of said source.

6. A converter for converting television signals from one of a plurality of input channels to a single preselected output channel, comprising in combination; a variable frequency oscillator for generating a signal having a selected frequency above any frequency within said input channels, a first mixer connected to receive signals within a selected one of said input channels and connected with said oscillator to mix said oscillator signal with said selected input channel signals, thereby raising the frequencies of signals from a selected input channel to a supervideo channel, a fixed frequency oscillator having a frequency greater than any frequency within said supervideo channel, and a second mixer connected with said fixed frequency oscillator and with said first mixer to lower the frequencies of signals within said supervideo channel to said preselected output channel, said variable frequency oscillator comprising an amplifying device, feedback means interconnecting the input and output of said amplifying device, a tuned circuit connected with said feedback for establishing the frequency of oscillation of said oscillator, said tuned circuit including varactor means, the reactive impedance of said varactor means being dependent upon the magnitude of a d.c. voltage applied thereto, and manually operable control means connected to said varactor means for applying a selected d.c. voltage thereto and comprising:

a plurality of individually operable double pole switches, a first plurality of potentiometers, one for each of said switches, means for connecting the taps of said first plurality of potentiometers individually to a contact of a first pole of said switches, a second plurality of potentiometers connected in parallel with the first said plurality of potentiometers, means for connecting the taps of said second plurality of potentiometers individually to a contact of a second pole of each of said switches, means for applying a potential difference between the end terminals of said potentiometers, a double-throw selector switch, means for connecting a contact of said selector switch with a contact of said first pole of all of said individually operable switches, means for connecting another contact of said selector switch with a contact of said second pole of all of said individually operable switches, and means for connecting the common terminal of said selector switch with said varactor means whereby the d.c. voltage applied to said varactor means is determined by the setting of the tap of one of the potentiometers associated with an operated one of said switches.

7. Apparatus according to claim 6, including first and second ganged fine-tuning rheostats, means for connecting one of said rheostats between a first terminal of each of said plurality of potentiometers and a source of d.c. potential, means for connecting the other rheostat between a second terminal of each of said plurality of potentiometers and a reference potential, and means for ganging said rheostats so that an increase in resistance of one of said rheostats is accompanied by a decrease in resistance of the other rheostat.

* * * * *